United States Patent [19]

Hawkins

[11] Patent Number: 5,184,857

[45] Date of Patent: Feb. 9, 1993

[54] REMOVABLE SIDE MOLDING TO PROTECT THE SIDE OF A VEHICLE

[76] Inventor: Michael J. Hawkins, 2346 Jeffrey Rd., Camarillo, Calif. 93012

[21] Appl. No.: 879,294

[22] Filed: May 7, 1992

[51] Int. Cl.⁵ .............................................. B60R 19/42
[52] U.S. Cl. .................................... 293/128; 280/770; 114/219
[58] Field of Search ....................... 293/128; 280/770; 114/219, 220

[56] References Cited

U.S. PATENT DOCUMENTS

| | | |
|---|---|---|
| 2,088,861 | 8/1937 | Klum .............................. 114/219 X |
| 2,889,165 | 6/1959 | Zientara ......................... 293/128 X |
| 2,965,407 | 12/1960 | Meisen ............................. 114/219 X |
| 3,113,546 | 12/1963 | Mountcastle ....................... 114/219 |
| 3,292,566 | 12/1966 | Russell ................................ 114/219 |
| 3,863,591 | 2/1975 | Wild ................................. 114/219 X |
| 4,000,532 | 1/1977 | Nielsen ............................ 114/219 X |
| 4,002,363 | 1/1977 | James . |
| 4,401,331 | 8/1983 | Ziner et al. . |
| 4,437,697 | 3/1984 | Hinojos . |
| 4,493,502 | 1/1985 | Campbell . |
| 4,561,685 | 12/1985 | Fischer . |
| 4,674,783 | 6/1987 | Hogan . |
| 4,810,013 | 3/1989 | Spears . |
| 4,991,891 | 2/1991 | Karshens . |
| 5,071,181 | 12/1991 | Wagner . |

FOREIGN PATENT DOCUMENTS

| | | |
|---|---|---|
| 689935 | 7/1964 | Canada . |
| 511441 | 12/1930 | Fed. Rep. of Germany . |
| 1077058 | 11/1954 | France . |

Primary Examiner—Charles A. Marmor
Assistant Examiner—Gary C. Hoge
Attorney, Agent, or Firm—Thomas I. Rozsa

[57] ABSTRACT

The present invention is a removable side bumper which is designed to be placed on the vehicle in a removable fashion when the vehicle is parked so that the vehicle is protected when people in neighboring vehicles open their doors. The present invention provides a shielding, by means of cushioned segments with an inner core tubing for support and a foam outer tubing for a cushioning, connected by a flexible cord which anchors to the wheel wells or the door wells of a vehicle and will prevent the side of the vehicle from being scratched or dented.

26 Claims, 1 Drawing Sheet

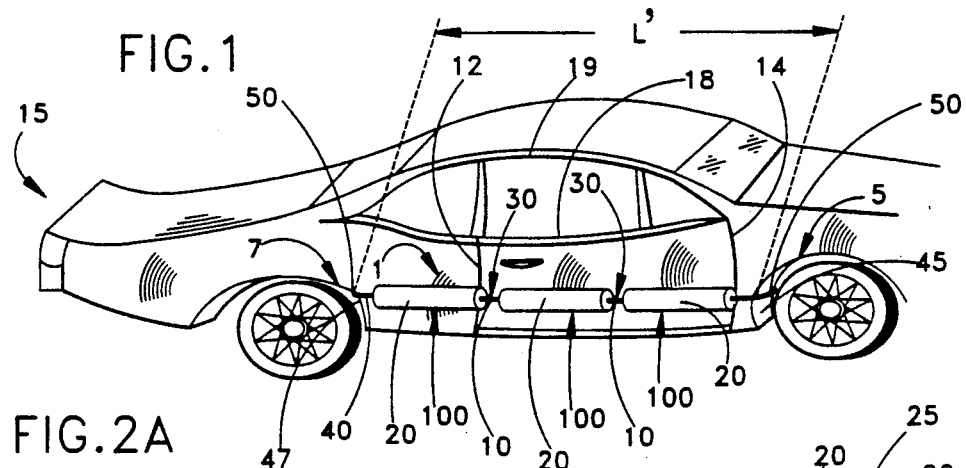
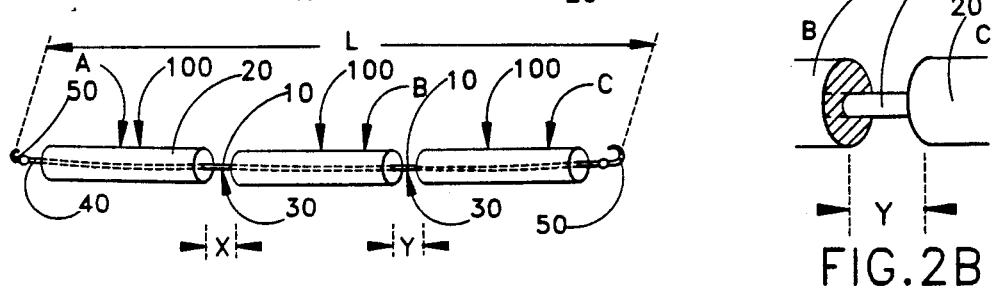
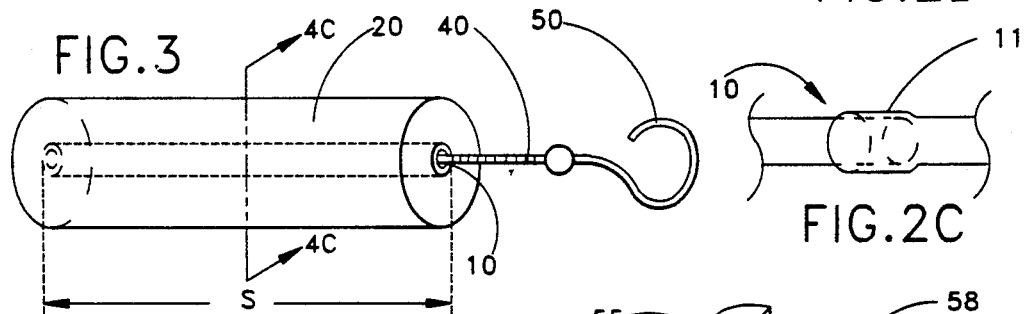
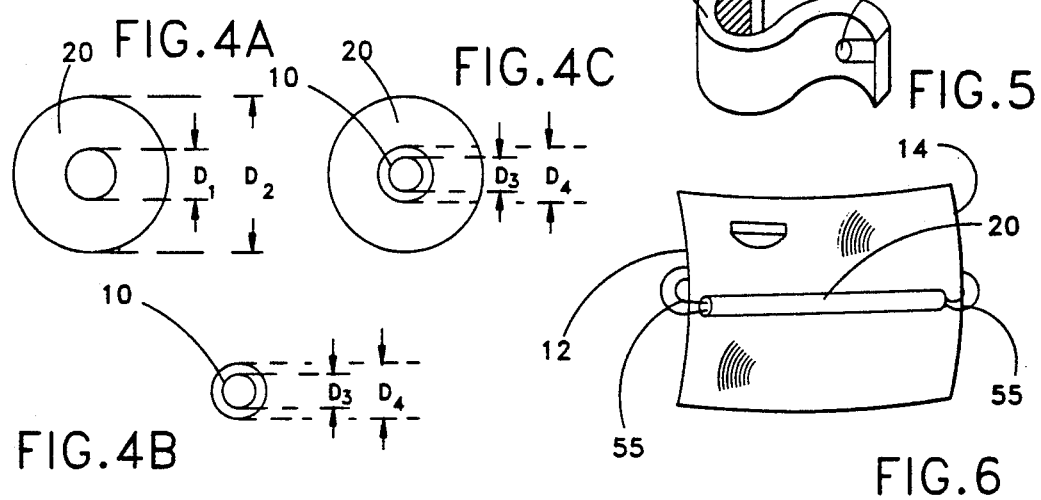

REMOVABLE SIDE MOLDING TO PROTECT THE SIDE OF A VEHICLE

BACKGROUND OF THE INVENTION

1. Field of the Invention

This invention relates to the field of removable side bumpers for vehicles. Specifically, the present invention relates to removable vehicle moldings which protect the side of the vehicle, so that when the vehicle is parked there will be a cushion in place to protect the side of the vehicle from being dented when others open the doors of neighboring vehicles. The present invention provides a shielding which will prevent the side of the vehicle from being scratched or dented.

2. Description of the Prior Art

The concept of moldings for the sides of vehicles has been seen in the prior art. Several patents exist which protect the side of a vehicle from scratches and dents. A number of these patents are bulky removable side protection devices which are hooked into the wheel well of the vehicle.

2.(a) Capsule Summary of the Present Invention For Comparison of the Prior Art The present invention relates to a removable side bumper for a vehicle which is designed to be placed on the vehicle in a removable fashion when the vehicle is parked so that the vehicle is protected when people in neighboring vehicles open their doors. The present invention provides a much better shielding in an easily manufacturable and low cost configuration, so that the side of the vehicle will not be dented.

Specifically, the concept is to start with an eight foot long length of pipe. The pipe can be made from plastic, steel, copper or other materials. To be specific, one such material could be ½ inch copper water pipe. The copper water pipe is then divided into segments where the segments can be connected by a slip fit, so that when the sections are connected, they will not wiggle or otherwise lose their rigid structure along the length of the segments. When the sections are disconnected, there will be hinged portions between the segments, so that the present invention can be folded to be a much shorter length when not in use and thereby be easily fitted inside the trunk of a vehicle.

Surrounding each segment of pipe is foam tubing which can be ½ inch in inner diameter to fit snugly around the ½ inch copper water pipe. The foam tubing can be any thickness, for example one or two inches in diameter. This provides a substantial cushion to offset the blows from doors of other vehicles which may be opened toward the vehicle being protected.

Running through the length of the water pipe is a flexible stretch cord, such as a bungee cord, which has hooks on the ends. The idea is to have the flexible stretch cord wrapped around the interior portions of the vehicle tire wheel well. When not in use, it can be slid down to be underneath the rocker portion of the vehicle and thereby be out of the way so that the door can be opened and closed and passengers can enter and exit the vehicle.

Along the length of the segments there can be two or more smaller diameter lengths which do not have the exterior foam tubing. These can include thin neoprene hose members which can serve as handles to grasp the pipe in the middle. The present invention can be folded into a smaller length package to be easily placed inside the trunk if it is desired to store it there during non-use as opposed to having it pulled down underneath the vehicle where it might get dirty during the vehicle's travels.

Therefore the uniqueness of the present invention is the segmented tubing and foam construction, stretchable cord and hook means of attachment with the following attributes. The tubing and foam construction make the device easily manufacturable. The segmented design enables the device to be easily folded and stored away when not in use. The stretchable cord and hook means of attachment serves to connect the segments and provides convenience for the user, permitting the device to be functional in a variety of vehicle designs where the wheel wells are spaced apart differently. The design can also fit to the ends of the door well, making a convenient fit to the side of a vehicle.

2.(b) Discussion of Prior Art Patents And Comparison To The Present Invention The following twelve patents are the closest prior art of which the inventor is aware.

1. U.S. Pat. No. 4,561,685 issued to Fischer on Dec. 31, 1985 for "Protective Pad for Side of Motor Vehicle". ("Fischer Patent")

2. U.S. Pat. No. 4,810,013 issued to Spears on Mar. 7, 1989 for "Door Guard". ("Spears Patent")

3. French Patent No. 1,077,058 issued to Schwob on Nov. 4, 1954 for "Dispositif de Protection Laterale pour Voitures Automobiles et Autres Vehicules". ("Schwob French Patent")

4. U.S. Pat. No. 4,674,783 issued to Hogan on Jun. 23, 1987 for "Removable Automobile Body Protective Guard with Lockable Attachment". ("Hogan Patent")

5. U.S. Pat. No. 4,002,363 issued to James on Jan. 11, 1977 for "Automotive Body Protective Apparatus". ("James" Patent)

6. U.S. Pat. No. 4,401,331 issued to Ziner et al. on Aug. 30, 1983 for "Automobile Door Guard". ("Ziner Patent")

7. U.S. Pat. No. 4,437,697 issued to Hinojos on Mar. 20, 1984 for "Retractable Automobile Sideguard". ("Hinojos Patent")

8. U.S. Pat. No. 4,493,502 issued to Campbell on Jan. 15, 1985 for "Car Body Guard". ("Campbell Patent")

9. U.S. Pat. No. 4,991,891 issued to Karshens on Feb. 12, 1991 for "Removable Locking Side Guard for Vehicle Protection". ("Karshens Patent")

10. U.S. Pat. No. 5,071,181 issued to Wagner on Dec. 10, 1991 for "Securement for a Resilient Vehicle Side Bumper". ("Wagner Patent")

11. Canadian Patent No. 689,935 issued to Parker on Jul. 7, 1964 for "Car Door Protector". ("Parker Canadian Patent")

12. German Patent No. 511,441 issued to Harbig on Oct. 30, 1930 for "Schutzvorrichtung fur Kraftfahrzeuge". ("Harbig German Patent")

The James Patent discloses an automotive body protective apparatus comprised of a plurality of separate elongated tubular members where a resilient interconnecting means is used for interconnection. A hook means is used to engage a body portion of the automobile which defines a wheel opening.

In comparison to the present invention, the relative complexity of the James Patent apparatus, due to the number of interconnecting parts involved in the construction of the apparatus, tend to complicate its manufacturability and diminish the potential benefits to the consumer as a low cost apparatus for protecting the door against indentations from other vehicles.

The present invention has a unique construction. The construction of the present invention specifically includes: a segmented design of an inner core tubing encased in an outer tubing made of foam, cylindrical construction; a slip fit means of connecting the inner core tubing for a rigid inner core structure; a spacing between the segments for the purpose of handling and folding; and a stretch cord means for connecting the segments and hook attachments. These basic features which, when assembled in a manner which is easily manufacturable, provide the consumer with a desirable and practical apparatus which accomplishes the task of protecting the side of the vehicle in a straightforward, less complicated manner.

In addition, since manufacturing costs would be much lower in the present invention, as compared to the James Patent, attributed to the elemental design which readily utilizes available parts of manufacture, the lower manufacturing costs could be passed over to the consumer thereby providing a less expensive means for protecting the side of a vehicle.

The Wagner Patent discloses a securement for a resilient vehicle side bumper which includes a hollow for an expandable bungee type member with fastening attachments at the terminal ends which include locking devices. The method of vehicle protection in the Wagner Patent is to use a bumper configuration which is connected to a cylindrical body having an arcuate or bowed passageway for the elastic member.

In comparison, the present invention has a segmented design and a simplified construction. This segmented design and elemental construction tends to improve the invention's practicality, that is, as an attachment which can be easily adapted to most vehicles. The present invention can be folded to a much shorter length package when not in use and can be easily fitted into the trunk of a vehicle which is especially desirable under conditions where it might get dirty when positioned under the vehicle.

The Fischer Patent discloses a protective pad for the side of a motor vehicle. The hollow plastic pipe is encased with foam. The means for suspending the hollow plastic pipe is by flexible belts which hang in a generally inverted Y shaped configuration and which is attached to the door of the vehicle.

The Spears Patent discloses a removable door guard attachable to a vehicle by means of hook members and is comprised of a plurality of spaced, elongated members which protect the vehicle.

The Schwob French Patent discloses spaced apart cushioning members attached from end to end of the car.

The Hogan Patent discloses a removable automobile body protective guard with lockable attachment. The attachment is a clamping device which attaches to the wheel wells. A shock cord is mounted from the point of the clamping device attachment.

The Ziner Patent discloses an automobile door guard which comprises telescopic, spring-urged tubes and a locking structure to lock the tubes at a selected length.

The Hinojos Patent discloses a retractable automobile sideguard which includes a first and second telescoping assembly which is pivoted to an upright position for usage.

The Campbell Patent discloses a car body guard which is comprised of a flexible rubber strap which rolls up in a housing and is mounted in one of the wheel wells of the car.

The Karshens Patent discloses a removable locking side guard for vehicle protection. The guard has a pivoting arm connected by a clamp for securing it to the vehicle.

The Parker Canadian Patent discloses a car door protector which clamps to the edge of the car door.

The Harbig German Patent discloses a sectional railing attachment which is comprised of several rails which attach to specific sections of the car such as the doors and fenders.

Therefore, none of the prior art have combined the concept of having: a segmented tubing and foam construction, stretchable cord and hook means of attachment with: an efficient utilization of existing materials which make the device easily manufacturable; a segmented design which enables the device to be easily folded and stored away when not in use; a slip fit means of connecting the segments for a rigid inner core structure; a stretchable cord and hook means of attachment which connects the segments and provides convenience and adaptability in a variety of vehicle designs where the wheel wells are spaced apart differently. Also, the alternative design has not been disclosed, which can fit to the ends of the door well, making a convenient fit to the side of a vehicle.

SUMMARY OF THE PRESENT INVENTION

The present invention is a removable side molding to protect the side of a vehicle. The molding is made up of a set of foam padded segments which extend between the two wheel wells at the side of the vehicle. The foam padded segments provide a durable cushioning to the vehicle due to the foam outer and hard inner core construction. There is a slip fit means of connecting the segments which provides a rigid inner core structure when the molding is placed at the side of the vehicle. The molding can be adapted to most vehicles because a flexible stretch cord extends through the length of the segments and anchors to the wheel wells, or in an alternative design, the stretch cord anchors the segments to the door wells of the vehicle. Due to the flexibility of the segments, the molding can be easily folded up and stored in the trunk of the vehicle when not in use. A hook or curved plate is used for anchoring the ends of the stretch cord. The curved plate can be used to distribute the forces at the point of connection so the present invention can be attached and removed easily without exerting excessive stress on the points of attachment to the vehicle body.

The present invention is primarily used in a parking lot where other vehicles are parked and where the occupants of an adjacent vehicle may open their vehicle door, resulting in a scratch or dent to the vehicle which is parked in the next space. The damage which results from occupants of a neighboring vehicle who negligently open their vehicle door upon another vehicle is significant. Vehicle owners who are concerned with the value of protecting the exterior surface of their vehicle from such an incident would appreciate the present invention.

Many vehicle owners are interested in a protection for the side of the vehicle which: is easy to adapt to their particular model of vehicle; is inexpensive; has an attractive design; can be easily stored away when not in use; and provides a substantial protective cushioning effect to offset the battering from the doors of other vehicles which may be opened toward the vehicle being protected. The present invention utilizes a unique arrangement of functional members to efficiently achieve these stated objectives.

It has been discovered, according to the present invention, that a plurality of segments comprised of a core tubing and foam outer construction, could provide the side of a vehicle with durable cushioning which protects the vehicle from scratches or indentations from neighboring vehicles when the vehicle is parked.

It has also been discovered, according to the present invention, that the plurality of segments comprised of a core tubing and foam outer construction connected by a flexible stretch cord passing through the center of the segmented core tubing of the plurality of segments, would allow the segments to be placed along the side of a vehicle to protect the side of the vehicle from scratches or indentations.

It has been additionally discovered, according to the present invention, that a slip fit connection between the inner core of each of the segments would provide a rigid inner core which extends the length of the segments.

It has been further discovered, according to the present invention, that a plurality of segments connected by a stretchable cord would provide flexibility between the segments, would enable the apparatus to be easily folded and stored away when not in use, and would also enable the apparatus to adapt to a variety of vehicle designs.

It has been additionally discovered, according to the present invention, that an anchor hook means of attaching the two terminal ends of the flexible stretch cord between the wheel wells of the vehicle could allow the plurality of segments to be strung across the side of the vehicle to protect the vehicle from scratches or indentations.

It has been further discovered, according to the present invention, that an anchor hook means of attaching the two terminal ends of the flexible stretch cord between the door wells of the vehicle could allow the plurality of segments to be strung across the side of the vehicle to also protect the vehicle from scratches or indentations.

It has also been discovered, according to the present invention, that a curved plate anchor could be adapted to the wheel well thereby distributing the forces at the point of connection to exert less stress on the body of the wheel well.

It has been further discovered, according to the present invention, that a curved plate anchor could be adapted to the door well, thereby distributing the forces at the point of connection to exert less stress on the body of the door well.

It has also been discovered, according to the present invention, that thin hose handles could be placed in spacings between the segments to provide handles for installing and removing the present invention from the vehicle on which it is installed.

It is therefore an object of the present invention to provide a plurality of segments comprised of a core tubing and foam outer construction, to furnish a durable cushioning which protects the side of a parked vehicle from scratches or indentations which may be imposed by neighboring vehicles.

It is also an object of the present invention to provide a flexible stretch cord which passes through the center of the segmented core tubing of the plurality of segments, to allow the segments to be placed along the side of a vehicle to protect the side of the vehicle from scratches or indentations.

It is an additional object of the present invention to provide a slip fit connection between the inner core of each of the segments, to thereby provide a rigid inner core for when the present invention extends the length of the segments.

It is a further object of the present invention to provide a plurality of segments connected by a stretchable cord for flexibility between the segments, to enable the apparatus to be easily folded and stored away when not in use, and also enable the apparatus to adapt to a variety of vehicle designs.

It is an additional object of the present invention to provide an anchor hook means of attaching the two terminal ends of the flexible stretch cord between the wheel wells of the vehicle, to allow the plurality of segments to be strung across the side of the vehicle to protect the vehicle from scratches or indentations.

It is a further object of the present invention to provide an anchor hook means of attaching the two terminal ends of the flexible stretch cord between the door wells of the vehicle, to allow the plurality of segments to be strung across the side of the vehicle to also protect the vehicle from scratches or indentations.

It is also an object of the present invention to provide a curved plate anchor to be adapted to the wheel well which distributes the forces at the point of connection and exerts less stress on the body of the wheel well.

It is a further object of the present invention, to provide a curved plate anchor to be adapted to the door well which distributes the forces at the point of connection and exerts less stress on the body of the door well.

It is also an object of the present invention to provide thin hose handles which could be placed in the spacings between the segments which would provide handles for installing and removing the present invention from the vehicle on which it is installed.

In the preferred embodiment of the present invention the removable side molding has a construction which includes the following features: a plurality of segments composed of a core tubing which conformably fits to an outer foam construction; a slip fit between the inner core segments; a flexible stretch cord which extends through the center of plurality of segments; an anchor hook means of attachment between the two terminating ends of the flexible stretch cord and the two wheel wells of the vehicle body; thin hose handles located between the segments; and the optional curved plate fastener for distributing the forces at the point of attachment to the wheel well.

In an alternative embodiment of the present invention, the removable side molding has a construction which includes the following features: a plurality of segments composed of a core tubing which conformably fits to an outer foam construction; a slip fit between the inner core segments; a flexible stretch cord which extends through the center of plurality of segments; an anchor hook means of attachment between the two terminating ends of the flexible stretch cord and the two door wells of the vehicle body; thin hose handles located between the segments for handling; and the optional curved plate fastener for distributing the forces at the point of attachment to the door well.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the vehicle molding apparatus attached to the wheel wells at the side of a vehicle.

FIG. 2A is a perspective view of the vehicle molding apparatus.

FIG. 2B is a perspective view of the thin hose handle between two of the cushioning segments.

FIG. 2C is a perspective view of the inner core tubing and the widened inner core part.

FIG. 3 is an enlarged perspective view of one of the cushioning segments including one end of the stretch cord.

FIG. 4A is a front plan view of a foam tube segment construction.

FIG. 4B is a front plan view of a cylindrical core tubing.

FIG. 4C is a cross section of line 4c—4c of FIG. 3, showing the cylindrical core tubing and outer foam tube construction.

FIG. 5 is a perspective view of the curved anchor plate.

FIG. 6 is a view of the alternative embodiment affixed to the side of the door.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown a perspective view of the removable side molding 1 to protect the side of a vehicle 15. There is a front wheel well 5 and a back wheel well 7 located at the side of the vehicle 15. Within each wheel well region there is a front rim 45 and a back rim 47, corresponding to the front wheel well 5 and the back wheel well 7 respectively.

Most vehicles have a front rim 45 with a curvature which the anchor hook 50 of the present invention removable side molding 1 can grasp. The back rim 47 also has an inside curvature which curves across a semicircular arc inwardly to the central region of the vehicle 15. There is an anchor hook 50 at both ends of the removable side molding 1 which attaches to the front rim 45 and the back rim 47 and is connected to each end of the stretch cord 40 which extends through the cushioning segments 100.

There are a plurality of cushioning segments 100 which are shown at the side of the vehicle 15. The cushioning segments 100 are held in such a position that the vehicle 15 would be protected in the event that the door of a neighboring vehicle opens toward the vehicle 15 which is being protected. The cushioning segments 100 provide cushioning protection for the side of the vehicle 15. The cushioning segments 100 have an inner core tubing 10 shown exposed at the location of the spacings 30 between the cushioning segments 100, and a foam tube segment 20 outer layer which serves as padding. The inner core tubing 10 rigidly extends through the center of each foam tube segment 20 and through the length of the cushioning segments 100 by means of a slip fit interconnection which can be disconnected for easy and convenient storage when not in use. The slip fit interconnection of the inner core tubing 10 is shown in FIG. 2C.

Referring to FIG. 1, the cushioning segments 100 could have various covering materials. The foam tube segment 20 outer layer of the cushioning segments 100 have an outside surface of white or colored foam. In various embodiments, the foam tube segment 20 can also be covered with a smooth plastic covering, or the segments could be covered with a cloth material which could be removed and washed to keep the apparatus clean and attractive looking.

The cushioning segments 100 are connected through the center by a means of a stretch cord 40. The stretch cord 40 runs the length of the plurality of cushioning segments 100. There are a multiplicity of spacings 30 which are located between the cushioning segments 100. The cushioning segments 100 extend across the length of the side of a vehicle and the stretch cord 40 can be pulled to an elongated length L', so the stretch cord 40 can be fitted to various models of vehicles. When the stretch cord 40 is not stretched, the length from anchor hook to anchor hook is designated by a regular length L distance shown in FIG. 2A. The stretch cord 40 has an elastic pull strength property which exerts a tension pull force when the stretch cord is pulled past its regular length L. The tension pull force is proportional to the difference between the extended length L' and the regular length L.

Referring again to FIG. 1, at each end of the stretch cord 40 there is an anchor hook 50. The anchor hook 50 at the front wheel well 5 grasps the front rim 45 of the vehicle's front wheel well 5. In a similar manner, another anchor hook 50 grasps the back rim 47 of the back wheel well 7. The anchor hook 50 is not intended to be limited in grasping the front rim 45 and the back rim 47. The anchor hook 50 is designed to grasp any joint or appendage in the front wheel well 5 and the back wheel well 7 region. The anchor hook 50 could be configured in a variety of styles. The anchor hook 50 could be fitted with a lock to secure the anchor hook 50 at the point of attachment.

Referring to FIG. 5, a curved anchor plate 55 with a hook fastener 58 could be used to mount the two ends of the stretch cord 40. The advantage to using a curved anchor plate 55 is that the force at the point of connection is distributed over a larger surface area in a curved anchor plate 55. In addition, referring to FIG. 6, a curved anchor plate 55 could be necessary to grasp and to fit into a narrow gap at the sides of the door.

Referring again to FIG. 1, there are several other points of attachment on the side of the vehicle 15 for a removable side molding 1. In an alternative embodiment, the removable side molding 1 can be mounted to the left door well 12 and the right door well 14.

Referring to FIG. 2A, there are spacings 30 between the cushioning segments in the present embodiment. Referring to FIG. 2B, there can be one or more thin hose handle members 25 which fit to the spacings 30 and can provide a means for the user to hold the apparatus by the middle. The stretch cord 40 also fits through the center of the thin hose handle 25. The thin hose handle 25 can be made from neoprene or another plastic type material which could fit around the inner core tubing 10 to serve as a handle.

Referring to FIG. 2A, there are a plurality of cushioning segments 100, connected by the stretch cord 40. In this embodiment, there are three cushioning segments 100 designated segment A, segment B, and segment C. The number of cushioning segments 100 are designated by reference only for illustrative purposes. In fact, there are a number of embodiments which have varying numbers of cushioning segments 100 (either one, two, four, etc.) and the present invention is not intended to be limited to only three.

Corresponding to the spacings 30 between the cushioning segments 100 there are two spacings, spacing X and spacing Y. In the spacings 30 region, each inner core tubing 10 fits to the neighboring inner core tubing 10 by fitting each member to the adjacent member. This is accomplished through a slip fit, shown in FIG. 2C, where the inner core tubing 10 has a widened inner core part 11 at one end, so that it can be easily connected together with an adjacent inner core tubing 10 to maintain a rigid length through the segments. The inner core tubing 10 with the slip fit connection can also be easily disconnected from the adjacent inner core tubing for storage. The stretch cord 40 serves to keep adjacent inner core tubings adjacent one another after they have been disconnected so that the folded side protector 10 is easily stored.

At the spacings 30, there could be, as shown in FIG. 2B, a thin hose handle 25 placed around the inner core tubing 10. The thin hose handle 25 is shown between segment B and segment C in the spacing Y. The outer foam tube segment 20 at the outer surface of segment B and segment C is additionally shown. The thin hose handle 25 can enable the user to remove and install the apparatus by one or more of the thin hose handles 25. The thin hose handle 25 can be made out of neoprene or another plastic material which could easily fit over the inner core tubing 10 and is easy to grip.

Referring to FIG. 2C, the slip fit of the inner core tubing 10 is shown. There is a widened inner core part 11 which allows each inner core tubing 10 to be fit to an adjacent member. The slip fit maintains a rigid length throughout the length of the inner core tubing 10. Referring to FIG. 2A, this slip fit section is generally located at the spacings 30. The cushioning segments 100 with the foam tube segment 20 which protects the vehicle will not sag at the middle due to the rigidity of the interconnected inner core tubing 10.

The spacings 30 provide a hinge function to the apparatus, so the removable vehicle molding can be disconnected at the slip fit and folded to be a much shorter length when not in use and thereby be easily fitted inside the trunk of a vehicle.

Referring again to FIG. 2A, the stretch cord 40 runs the entire length of the cushioning segments 100. The stretch cord 40 could be composed of two or more stretch cords 40 which are connected along the longitudinal length of the cushioning segments. It can be seen that the unstretched length L of the present invention extends beyond the length of the segments 100. For purposes of manufacturing with readily available stretch cords, and to economize, with efficient usage of materials in production, the present invention should not be limited to utilizing a single stretch cord 40. The stretch cord 40 could be connected at the spacings 30 at the side of the cushioning segments 100 so that the stretch cord 40 material could be preserved. However, in the preferred embodiment, the stretch cord 40 extends the entire length of the cushioning segments 100 to the anchor hooks 50 attached at the two ends of the stretch cord 40.

Referring to FIG. 3, the cushioning segments 100 are comprised of an inner core tubing 10 which is encased by a foam tube segment 20. There is a segment length S which is measured along the length of the foam tube segment 20. The inner core tubing 10 fits conformably and concentric to the foam tube segment 20 along the segment length S. The inner core tubing 10 should be composed of a hard substance which, when fitted to the foam tube segment 20, will cause the foam tube segment 20 to cylindrically compress away from its central axis toward its outer periphery. In essence, the inner core tubing 10 will make a snug fit to the foam tube segment 20.

Referring to FIG. 4A, the foam tube segment 20 is shown. The foam tube segment 20 has two diameters. The thickness is the difference between the inside diameter D1 and the outside diameter D2. The foam tube segment 20 can have various thickness dimensions, for example, one or two inches. This could provide a substantial cushion to offset the blows from doors of other vehicles which may be opened toward the vehicle being protected.

Referring to FIG. 4B, there is an inner core tubing 10. The material for the inner core tubing 10, by means of example, may be one half inch copper tubing. A plastic tubing could also be used. The inner core tubing 10 is a protecting and strengthening member which acts as a barrier between the less sturdy foam tube segment 20 and the stretch cord 40. The inner core tubing 10 should be strong enough to maintain rigidity, especially at the slip fit discussed earlier. The soft foam composition of the foam tube segment 20 could easily deteriorate if the abrasive stretch cord 40 were permitted to directly contact the foam tube segment 20 and gnaw against its hollowed center during usage. The inner core tubing 10 should be made from a material which will maintain rigidity, and will protect the soft foam composition of the foam tube segment 20 from the stretch cord 40.

Referring to FIG. 4C, the foam tube segment 20 with its inner core tubing 10 is shown, and the two diameters of the inner core tubing 10 are depicted. The inside core diameter D3 and the outside core diameter D4 are shown on the inner core tubing 10 which is placed concentric to the foam tube segment 20. The inner diameter of the foam tube segment 20 should be less than the outside core diameter D4 so that the inner core tubing 10 snugly fits inside the foam tube segment 20. The inside core diameter D3 should be large enough to accommodate the stretch cord 40.

Extending through the length of the inner core tubing 10 is a flexible stretch cord 40. The stretch cord 40 can be a bungee type cord. The stretch cord 40 can allow the car molding 1 be slid down to be underneath the vehicle and out of the way so the door can be opened and closed and passengers can enter and exit the vehicle. Since the segmented design allows the apparatus to be folded up, the apparatus could be stored inside the trunk during periods where the apparatus would not be used, especially if the vehicle were traveling a distance where the apparatus might get dirty.

Referring to FIG. 5 and FIG. 6, the curved anchor plate 55, shown in FIG. 5, could clip to the sides of the door, as shown in FIG. 6. The left door well 12, and the right door well 14 can be easily attached by the curved anchor plate 55. The curved anchor plate 55 has a perforation 58 for attaching the curved anchor plate 55 to the end of the flexible cord 40. As shown in FIG. 6, only one foam tube segment 20 is used to extend the width of the door, from the left door well 12 to the right door well 14.

Defined in detail, the present invention is a removable vehicle molding, secured between the two wheel wells at the side of the vehicle, to protect the vehicle from scratches and dents inflicted by nearby vehicles, comprising: (a) a plurality of cushioning segments which are comprised of an inner hollow core tubing member which conformably fits inside and concentric to a foam outer tube member; (b) an interconnection of the cushioning segments by means of a slip fit between each adjacent inner core tubing member of each adjacent cushioning segment to form a rigid length of cushioning segments extending the length of the combined segments; (c) a flexible stretch cord connecting means which passes through the hollow center of the core tubing member of the cushioning segments and has two ends with an anchoring hook attached at each respective end to enable the movable vehicle molding to be anchored to the two respective wells at the side of the vehicle; and (d) a spacing between the cushioning segments, where the inner core tubing members can be disconnected at the location of the slip fit and folded for storage.

Defined alternatively, the present invention is a removable vehicle molding, secured between the two door wells at the side of the vehicle, to protect the vehicle from scratches and dents inflicted by nearby vehicles, comprising: (a) at least one cushioning segment, comprised of an inner hollow core tubing member which conformably fits inside and concentrically to a foam outer tube member; and (b) a flexible stretch cord connecting means which passes through the center of the at least one cushioning segment and has two ends with a curved anchor plate attached at each respective end to enable the removable vehicle molding to be anchored to the two respective door wells at the side of the vehicle.

Defined broadly, the present invention is a removable vehicle molding, to protect the side of a vehicle, comprising: (a) at least one cushioning segment which is comprised of an inner hollow core tubing member which conformably fits inside and concentric to a foam tube member; and (b) one or more flexible stretch cord members which have anchoring means attached at the ends of the flexible cord by which the removable vehicle molding is fastened at two respective locations on the side of the vehicle.

Defined more broadly, the present invention is a removable vehicle molding, secured between the two wheel wells at the side of the vehicle, to protect the vehicle from scratches and dents inflicted by nearby vehicles, comprising: (a) a multiplicity of rigid hollow pipe segments removably attached to one another to form a rigid central hollow core; (b) a multiplicity of spaced apart cushioning segments attached around said multiplicity of rigid hollow pipe segments to thereby form a multiplicity of cushioning segments separated from one another by a gap at the location where the pipe segments are removably attached; and (c) a flexible stretch cord connecting means which passes through the hollow center of the multiplicity of rigid hollow pipe segments and has two ends with a connecting means attached at each respective end to enable the removable vehicle molding to be anchored to the two respective wheel wells at the side of the vehicle.

Defined even more broadly, the present invention is a removable vehicle side molding, secured between the two door wells at the side of the vehicle, to protect the vehicle from scratches and dents inflicted by nearby vehicles, comprising: (a) a rigid hollow pipe segment; (b) a cushioning member attached around said rigid hollow pipe segment to thereby form a cushioning segment; and (c) a flexible stretch cord connecting means which passes through the center of the hollow pipe segment and has two ends with attaching means attached at each respective end to enable the removable vehicle side molding to be secured to the two door wells.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A removable vehicle molding, secured between the two wheel wells at the side of the vehicle, to protect the vehicle from scratches and dents inflicted by nearby vehicles, comprising:
    a. a plurality of cushioning segments which are comprised of an inner hollow core tubing member which conformably fits inside and concentric to a foam outer tube member;
    b. an interconnection of the cushioning segments by means of a slip fit between each adjacent inner core tubing member of each adjacent cushioning segment to form a rigid length of cushioning segments extending the length of the combined segments;
    c. a flexible stretch cord connecting means which passes through the hollow center of the core tubing member of the cushioning segments and has two ends with an anchoring hook attached at each respective end to enable the movable vehicle molding to be anchored to the two respective wells at the side of the vehicle;
    d. a spacing between the cushioning segments, where the inner core tubing members can be disconnected at the location of the slip fit and folded for storage; and
    e. at least one hose handle located in said spacing area between said cushioning segments to grip the apparatus during installation or removal.

2. The invention in accordance with claim 1, where the thin hose handle is made from neoprene.

3. The invention in accordance with claim 1, where the inner core tubing member is made from metal tubing.

4. The invention in accordance with claim 1, where the inner core tubing member is made from plastic tubing.

5. The invention in accordance with claim 1, where the anchoring hooks are locked to the two wheel well regions on the side of the vehicle.

6. A removable vehicle molding, secured between the two door wells at the side of the vehicle, to protect the vehicle from scratches and dents inflicted by nearby vehicles, comprising:
   a. at least one cushioning segment, comprised of an inner hollow core tubing member which conformably fits inside and concentrically to a foam outer tube member;
   b. a flexible stretch cord connecting means which passes through the center of the at least one cushioning segment and has two ends with a curved anchor plate attached at each respective end to enable the removable vehicle molding to be anchored to the two respective door wells at the side of the vehicle; and
   c. at least one thin hose handle for handling the vehicle molding during installation or removal of the apparatus.

7. The invention in accordance with claim 6, where the thin hose handle is made from neoprene.

8. The invention in accordance with claim 6, where the inner hollow core tubing member is made from metal tubing.

9. The invention in accordance with claim 6, where the inner core tubing member is made from plastic tubing.

10. The invention in accordance with claim 6, where the anchoring hooks are locked to the two door well regions at the side of the vehicle.

11. A removable vehicle molding, to protect the side of a vehicle, comprising:
    a. at least one cushioning segment which is comprised of an inner hollow core tubing member which conformably fits inside and concentric to a foam tube member;
    b. a flexible stretch cord having anchoring means attached at the ends of the flexible cord by which the removable vehicle molding is fastened at two respective locations on the side of the vehicle; and
    c. at least one hose handle for handling the vehicle molding during installation or removal of the apparatus.

12. The invention in accordance with claim 11, where the inner core tubing member of the cushioning segments are made from metal tubing.

13. The invention in accordance with claim 11, where the inner core tubing member of the cushioning segments are made from a plastic tubing.

14. The invention in accordance with claim 11, where the anchoring means are hook anchors which attach to the wheel well region at the side of the vehicle.

15. The invention in accordance with claim 14, where the hook anchor is locked to the wheel well region at the side of the vehicle.

16. The invention in accordance with claim 11, where the anchoring means is a curved anchor plate.

17. The invention in accordance with claim 16, where the curved anchor plate is locked to the wheel well region at the side of the vehicle.

18. The invention in accordance with claim 11, where the anchoring means is a hook anchor to attach to the sides of the door well.

19. The invention in accordance with claim 18, where the hook anchor is locked to the sides of the door well.

20. The invention in accordance with claim 11, where the anchoring means is an anchor plate, mounted to distribute the connection force at the door well region.

21. The invention in accordance with claim 20, where the anchor plate is locked to the door well region.

22. The invention in accordance with claim 11, where there is a plastic material covering for the cushioning segments.

23. The invention in accordance with claim 11, where there is a cloth material covering for the cushioning segments.

24. A removable vehicle molding, secured between the two wheel wells at the side of the vehicle, to protect the vehicle from scratches and dents inflicted by nearby vehicles, comprising:
    a. a multiplicity of rigid hollow pipe segments removably attached to one another to form a rigid central hollow core;
    b. a multiplicity of spaced apart cushioning segments attached around said multiplicity of rigid hollow pipe segments to thereby form a multiplicity of cushioning segments separated from one another by a gap at the location where the pipe segments are removably attached;
    c. a flexible stretch cord connecting means which passes through the hollow center of the multiplicity of rigid hollow pipe segments and has two ends with a connecting means attached at each respective end to enable the removable vehicle molding to be anchored to the two respective wheel wells at the side of the vehicle; and
    d. hose handles surrounding two joined pipe segments at the location of each area of joinder between pipe segments.

25. The invention in accordance with claim 24 where one end of each pipe segment is enlarged to provide a slip fit to the end of an adjacent pipe segment to thereby provide the removable attachment.

26. A removable vehicle side molding, secured between the two door wells at the side of the vehicle to protect the vehicle from scratches and dents inflicted by nearby vehicles, comprising:
    a. a rigid hollow pipe segment;
    b. a cushioning member attached around said rigid hollow pipe segment to thereby form a cushioning segment;
    c. a flexible stretch cord connecting means which passes through the center of the hollow pipe segment and has two ends with attaching means attached at each respective end to enable the removable vehicle side molding to be secured to the two door wells; and
    d. at least one hose handle for handling the vehicle molding during installation or removal of the apparatus.

* * * * *